US010154374B2

United States Patent
Rifkin et al.

(10) Patent No.: US 10,154,374 B2
(45) Date of Patent: Dec. 11, 2018

(54) PROXIMITY-BASED GEOFENCED UNIVERSAL URL

(71) Applicant: Aircam Inc., Santa Monica, CA (US)

(72) Inventors: Ryan Rifkin, Los Angeles, CA (US); Evan Rifkin, Pacific Palisades, CA (US); Steve Lackenby, Topanga, CA (US); Alex Pronin, Calabasas, CA (US); David Hopkins, Santa Monica, CA (US)

(73) Assignee: Aircam Inc., Santa Monica, CA (US)

( * ) Notice: Subject to any disclaimer, the term of this patent is extended or adjusted under 35 U.S.C. 154(b) by 0 days.

(21) Appl. No.: 16/005,985

(22) Filed: Jun. 12, 2018

(65) Prior Publication Data

US 2018/0302745 A1 Oct. 18, 2018

Related U.S. Application Data

(63) Continuation-in-part of application No. 15/926,821, filed on Mar. 20, 2018, which is a continuation of
(Continued)

(51) Int. Cl.
*H04W 4/21* (2018.01)
*H04W 4/021* (2018.01)
*H04L 29/08* (2006.01)

(52) U.S. Cl.
CPC .............. *H04W 4/021* (2013.01); *H04L 67/18* (2013.01); *H04W 4/21* (2018.02)

(58) Field of Classification Search
CPC ......... H04W 4/21; H04W 2/00; H04W 4/021; H04L 67/18
(Continued)

(56) References Cited

U.S. PATENT DOCUMENTS 7,366,523 B2 4/2008 Viikari et al.
9,589,255 B1 3/2017 Sandrew
(Continued)

FOREIGN PATENT DOCUMENTS

WO 2012153986 A2 11/2012

OTHER PUBLICATIONS

Lautamo, Molly, "Gluon: A photo-sharing app based on where you go, not who you know", website article posted Jun. 23, 2016, http://www.santacruztechbeat.com/2016/06/23/gluon-photo-sharing-app/, website last accessed Sep. 7, 2017, pp. 1-5.

*Primary Examiner* — Phong La
(74) *Attorney, Agent, or Firm* — SoCal IP Law Group LLP; Steven C. Sereboff

(57) ABSTRACT

There is disclosed herein a system and method for enabling proximity-based, peer-to-peer sharing of media in which a first device having a wireless communication surrounding the device detects other wireless devices within the region. Communication connections are formed between the wireless devices and a list of the connections is maintained. Without input from a user, media is shared between the individual devices on the connections list and between the individual devices on the connections list and a remote server. Devices not included in the list of connections are blocked from accessing the media. Access to the media is available for a pre-determined period of time, after which time access to the media is blocked for all devices.

8 Claims, 13 Drawing Sheets

Related U.S. Application Data application No. 15/698,914, filed on Sep. 8, 2017, now Pat. No. 9,961,493, which is a continuation-in-part of application No. 15/069,884, filed on Mar. 14, 2016.

(60) Provisional application No. 62/133,221, filed on Mar. 13, 2015.

(58) Field of Classification Search
USPC .......................................................... 370/270
See application file for complete search history.

(56) References Cited

U.S. PATENT DOCUMENTS

| | | |
|---|---|---|
| 9,615,201 B2 | 4/2017 | Alkabra et al. |
| 9,628,950 B1 | 4/2017 | Noeth et al. |
| 9,635,108 B2 | 4/2017 | Thomas |
| 2003/0004916 A1 | 1/2003 | Lewis |
| 2007/0155307 A1 | 7/2007 | Ng et al. |
| 2008/0062940 A1 | 3/2008 | Othmer et al. |
| 2009/0054092 A1 | 2/2009 | Stonefield et al. |
| 2011/0066691 A1 | 3/2011 | Jideani |
| 2011/0279269 A1 | 11/2011 | Gerber |
| 2013/0109412 A1 | 5/2013 | Nguyen et al. |
| 2013/0111520 A1 | 5/2013 | Lo et al. |
| 2013/0217332 A1 | 8/2013 | Altman et al. |
| 2013/0331127 A1* | 12/2013 | Sabatelli ................. H04W 4/80 455/456.3 |
| 2014/0018105 A1* | 1/2014 | O'Neil .................... H04W 4/80 455/456.3 |
| 2014/0207889 A1 | 7/2014 | King et al. |
| 2014/0213227 A1 | 7/2014 | Rao |
| 2014/0249938 A1 | 9/2014 | Garrett et al. |
| 2015/0002271 A1 | 1/2015 | Lee et al. |
| 2015/0058409 A1 | 2/2015 | Wang |
| 2015/0065172 A1* | 3/2015 | Do ........................ H04L 63/107 455/456.3 |
| 2015/0189535 A1 | 7/2015 | Bekiares et al. |
| 2015/0262195 A1 | 9/2015 | Bergdale et al. |
| 2015/0281878 A1 | 10/2015 | Roundtree et al. |
| 2015/0288760 A1* | 10/2015 | Thomas ............... H04L 67/1095 709/203 |
| 2015/0356121 A1 | 12/2015 | Schmelzer |
| 2016/0012465 A1 | 1/2016 | Sharp |
| 2016/0065626 A1 | 3/2016 | Jain et al. |
| 2016/0173625 A1 | 6/2016 | Ruben et al. |
| 2016/0212190 A1 | 7/2016 | Kim et al. |

\* cited by examiner

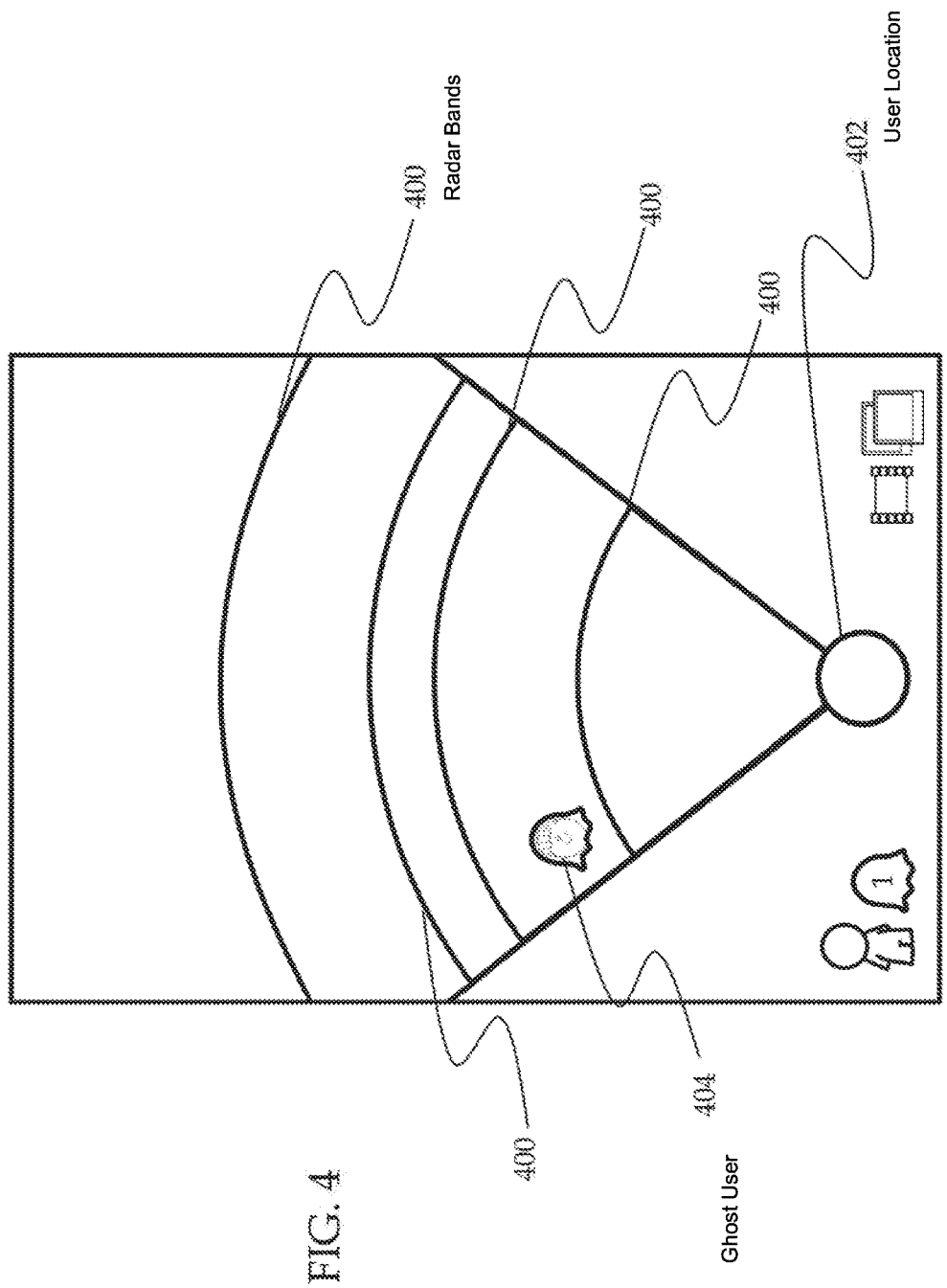

PROXIMITY-BASED GEOFENCED UNIVERSAL URL

CROSS-REFERENCE TO RELATED APPLICATIONS INFORMATION

This patent claims priority to U.S. provisional patent application No. 62/133,221 filed Mar. 13, 2015 entitled PROXIMITY-BASED CONTENT SHARING SCHEME.

This patent is a continuation in part and also claims priority to U.S. patent application Ser. No. 15/069,884, filed Mar. 14, 2016, entitled PROXIMITY-BASED CONTENT SHARING SCHEME and U.S. patent application Ser. No. 15/926,821, filed Mar. 20, 2018, entitled GEOFENCED UNIVERSAL URL which is a continuation of U.S. patent application Ser. No. 15/698,914, filed Sep. 8, 2017, now U.S. Pat. No. 9,961,493, granted May 1, 2018, entitled GEOFENCED UNIVERSAL URL, the disclosures and figures of each of these are incorporated by reference as if set forth herein in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner have no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to access to shared media content and computer networking and more particularly to a proximity-based content sharing scheme for use with mobile computing devices.

Description of the Related Art

Over the last decade, social and other networking websites and mobile device applications have become ubiquitous. Most current social networks require users to search for or explicitly invite and connect with other users in a cumbersome manner, and typically require the inviting or connecting user to know something about the other person(s), such as their email address, real name, user name, phone number etc., or to share an existing third-party connection with the target connection and add or invite them to one or more of the social networks.

While these traditional networks are useful for connecting people based on some degree of prior knowledge or information about the connecting individuals, it is desirable to provide a social networking mechanism to allow for proximity-based content sharing based on location proximity, without more.

SUMMARY OF THE INVENTION

According to one aspect of the present invention, there is presented a method and apparatus for proximity-based content sharing on wireless devices in which a first device having a wireless communication region surrounding the device detects other wireless devices within the region. Communication connections are formed between the wireless devices. Without input from a device user, data is pushed from the wireless device to other wireless devices in the region and to a remote server, or data may be obtained from the wireless device by other wireless devices in the region or from the remote server. Communication connections can also be formed between devices in the region and devices outside the region and data may be pushed to the devices outside the region. Users can block other devices either within the region or outside the region so that they do not receive pushed data.

DESCRIPTION OF THE DRAWINGS

FIG. 4 is an illustration of a radar type screen on a device according to the present invention, with a "ghost" indicator.

Figure 1:
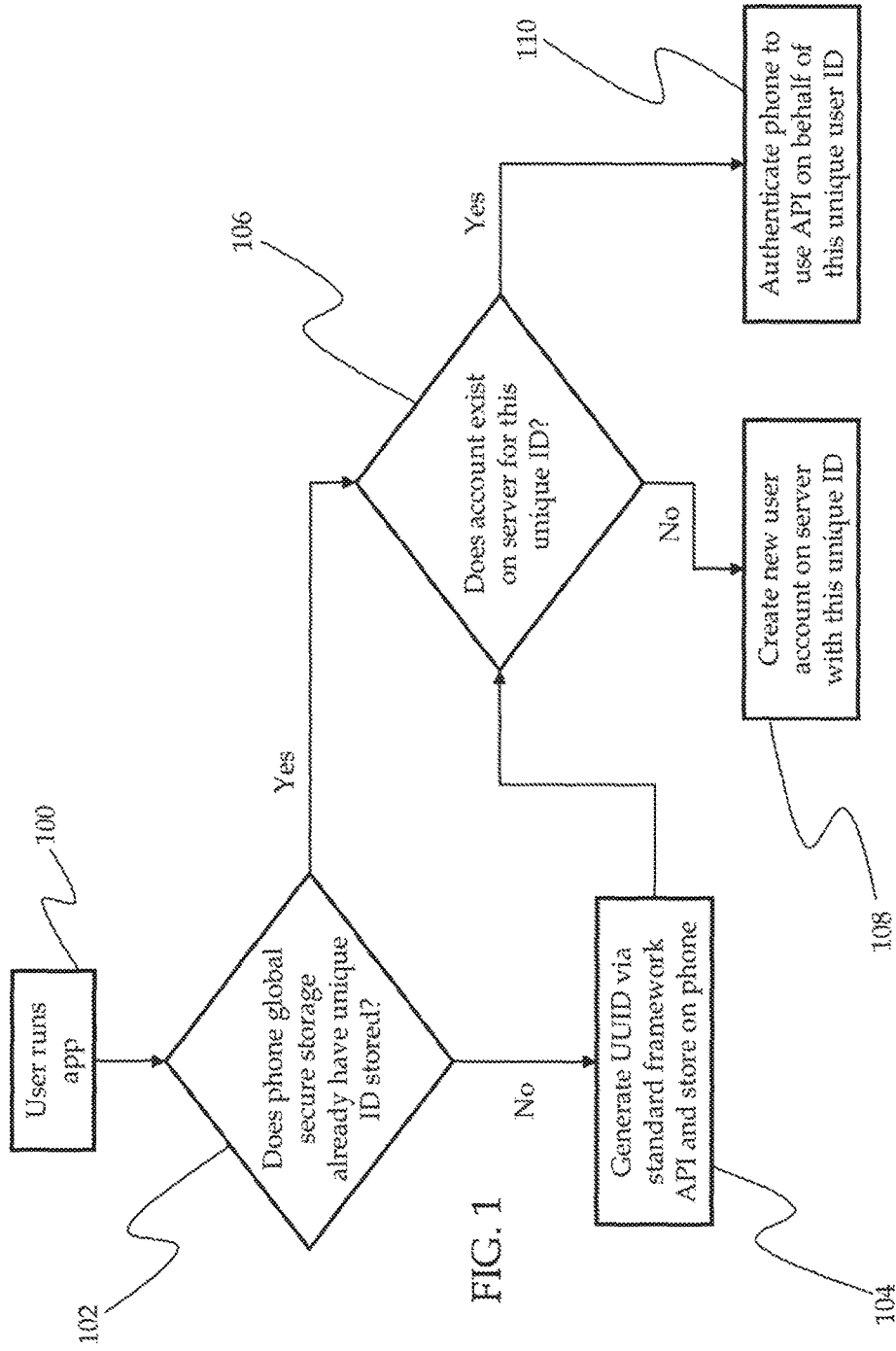
FIG. 1 is a flow chart illustrating an account creation process according to the present invention.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

The present invention relates to a proximity-based content sharing scheme. The following description is presented to enable one of ordinary skill in the art to make and use the invention and to incorporate it in the context of particular applications, various modifications, as well as a variety of uses, in different applications will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to papers and documents which are filed concurrently with this specification and which are open to public inspection with this specification, and the contents of all such papers and documents are incorporated herein by reference, all the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Further, note that content shared can be of any form, non-limiting examples of which include vibrations (e.g. someone tapping out Morse code or the beat of a song, a heartbeat, walking or running pace, jumping up and down etc.), sounds, video, images, text, or even other sensory experiences such as smells and odors.

Specific Details

The present invention provides a proximity-based content sharing scheme. Typically, the present invention would take the form of an "app" for use on a mobile device such as a smartphone or a tablet or smartwatch. However, the present invention can also be used on non-mobile or semi-mobile devices such as laptop or desktop computers. As a further non-limiting example, the present invention could be used in vehicles. For simplicity, this description will be placed in the context of the invention taking the form of an app for use on smartphones, such as an Apple iPhone operating with iOS or an Android mobile device.

The present invention allows and causes users of the app to seamlessly and automatically establish contact with, connect with, and maintain connections with other users of the app based, typically, on near-range location proximity, without more. This method of forming connections diverges from the more explicit friending/connecting methods of existing networks, although the application will still allow for these more traditional forms of making connections.

A flow chart illustrating an account creation process according to the present invention is depicted in FIG. 1. As can be seen, after downloading and installing the app onto their device, the user runs the app 100. The app checks the storage area of the device (e.g., KeyChain service on iOS devices) to determine if a Universally Unique Identifier (UUID) or similar identifier generated by the app is already present on the device 102. A pre-existing UUID would generally be present in cases where the app was previously installed and later deleted. If no UUID is present, a server computer creates a UUID for the device, typically through a standard framework Application Program Interface (API) and stores the UUID on the user's device 104. In either case, once a UUID is stored on the user's device, the server computer checks to determine whether an account exists for this particular UUID 106. If no account exists, a new user account is created with the device's UUID 108. Once an account does exist, the device is authenticated to use the API on behalf of the particular UUID 110. Note that once assigned, the UUID remains stored on the user's device even if the app is uninstalled. If the app is re-installed, the stored UUID is used. Also note that a UUID can be blocked; because the UUID is persistent in a particular device, there are no easy workarounds to eliminate blocks.

A non-limiting list of exemplary current near-range location proximity-based technologies that are useful in conjunction with the present invention include iBeacon, Beacon, and Bluetooth. The present invention uses such near-range location proximity-based methods to detect, identify, establish contact and connect, and share content between users of the app who are nearby, even if such other users have not manually opened or awakened their installed app. In other words, no sign up, no log-in, no phone, email, or text verification, no "friending," no "following," and no "liking" is necessary. If two (or more) devices within a certain proximity of each other have the app installed, content can be shared. For example, if app User A takes a photo using their device from within the user interface of the app, the photo will be automatically shared with all other users of the app that are in close proximity to User A's device. Again, photos are a non-limiting example of content that can be shared.

Figure 2A:
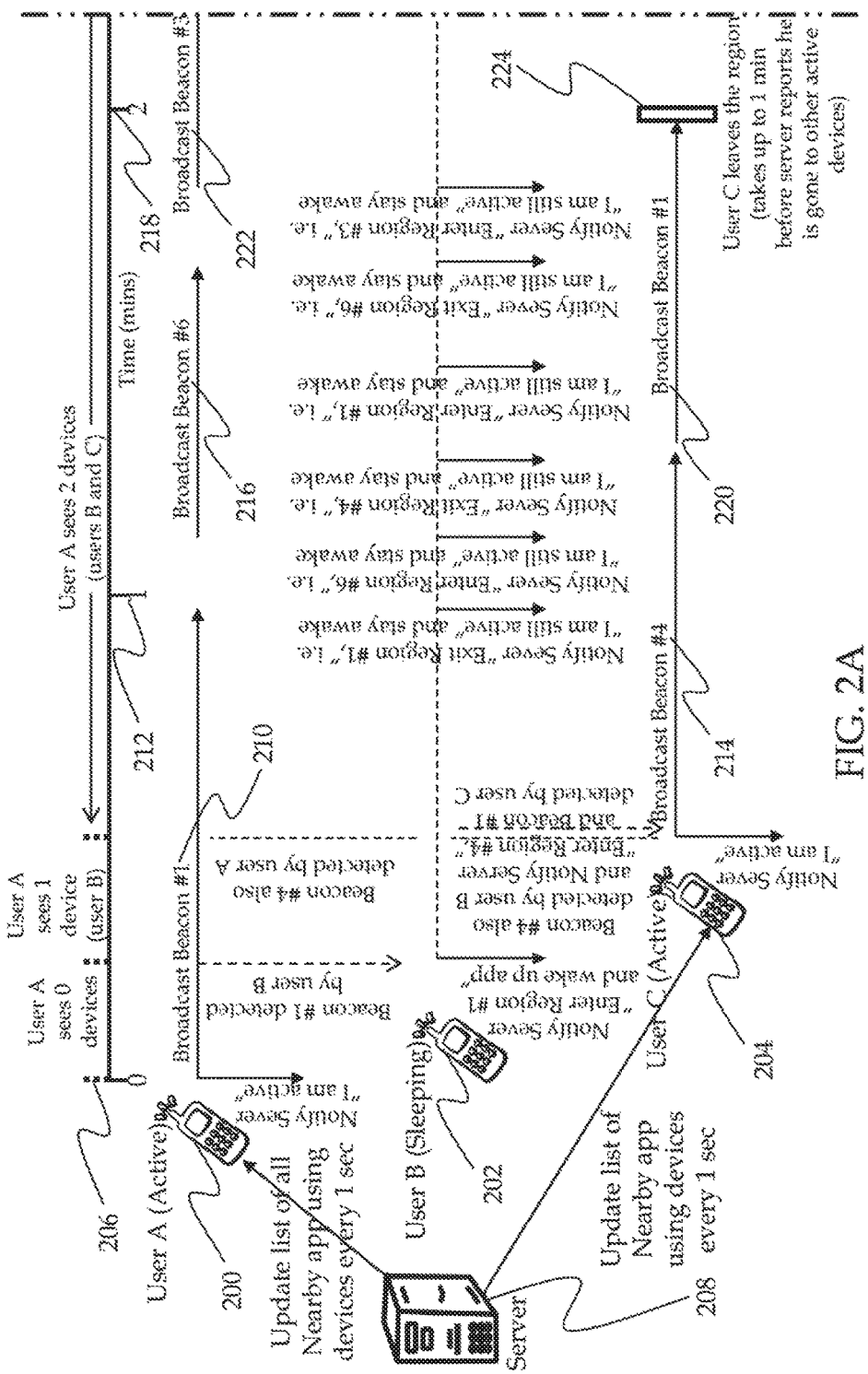
FIG. 2A and FIG. 2B are parts of a schematic diagram illustrating a device detection process according to the present invention, in which multiple beacons are used to ensure the connection of devices within a signal area.
Figure 2B:
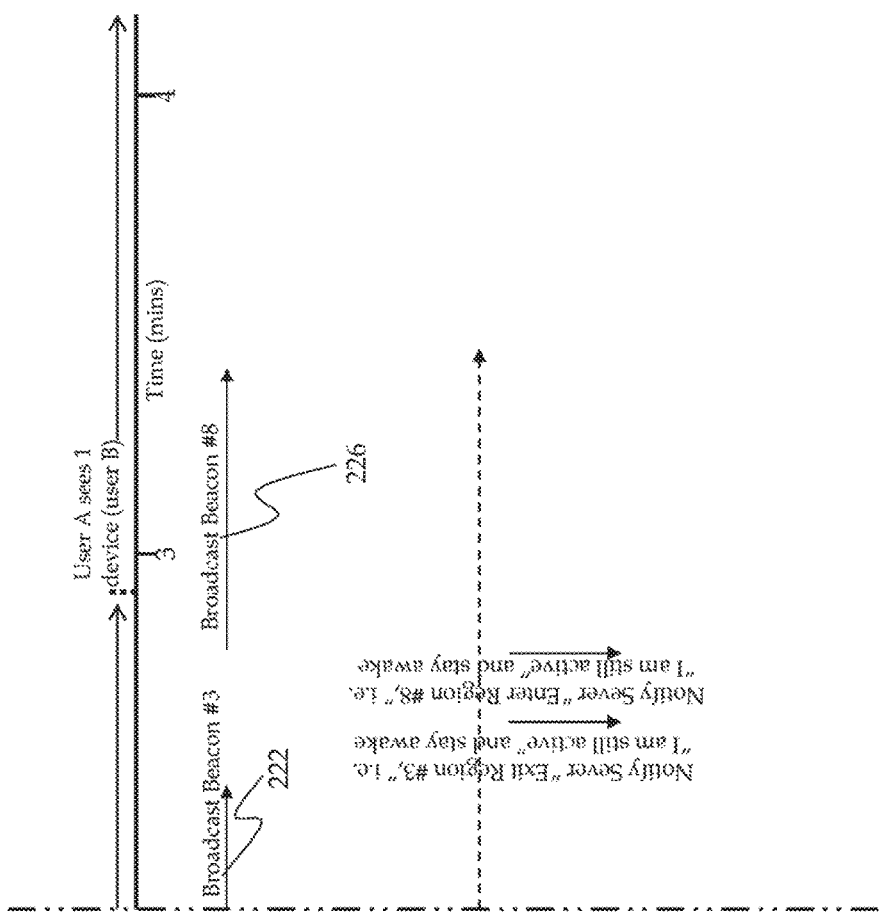

A schematic diagram illustrating a device detection process according to the present invention is presented in FIG. 2, in which multiple beacons are used to ensure the connection of devices within a signal area. Note that FIG. 2 is broken into FIG. 2A and FIG. 2B and that, together, they represent a continuous timeline flowing from the start in FIG. 2A through to FIG. 2B. This figure depicts interaction between three users. It is initially assumed that app User A 200 has the app installed with a valid account and that the app is open, active, and awake. It is further assumed, that app User B 202 has the app installed with a valid account, that the app is asleep (whether closed or open), and that User B is not initially within User A's proximity. Finally, it is assumed, that User C 204 has the app installed with a valid account, that the app is active, and that User C is not local to either User A 200 or User B 202. This is the state at a time=0 (minutes) 206.

For each device using the app, a list is maintained on a server computer 208. This list may be updated periodically, e.g., once per second, or it can be dynamically updated whenever a change occurs. In this discussion, the list is User A's 200. Starting at time=0 206, the device of User A 200 broadcasts beacon #1 210. At some point between time zero and time=1 212, beacon #1 210 is detected by the device of User B 202. The device of User B 202 notifies the server 208 that it has entered region #1 (the area of broadcast beacon #1 201) and the app is executed (woken up).

Also, between time=0 206 and time=1 212, the device of User C, which is active and has notified the server 208 of its active state, transmits broadcast beacon #4 214. Broadcast beacon #4 214 is detected by the devices of User A 200 and User B 202. User B notifies the server 208 that it has entered region #4 (the area of broadcast beacon #4 214). At the same time, broadcast beacon #1 is detected by the device of User C 204.

User B 202 remains in region #1 until the device of User A 200 ceases transmitting broadcast beacon #1. At this point, the device of User B notifies the server 208 that it is exiting region #1 and that it is still active and stays awake. The device of User A 200 then begins transmitting broadcast beacon #6 216. The device of User B 202, now in range of broadcast beacon #6 216 notifies the server 208 that it is entering region #6 and that it is still active and stays awake. Next, between time=1 212 and time=2 218, User C 204 ceases transmitting broadcast beacon #4 214. At this point, User B 202 notifies the server that it is exiting region #4 and that it is still active and stays awake. The device of User C 204 then begins transmitting broadcast beacon #1 220. The device of User B 202 notifies the server that it is entering region #1 and that it is still active and stays awake. Next, in the same time frame, the device of User A 200 ceases transmitting broadcast beacon #6 216. At this time, the device of User B 202 notifies the server 208 that it is exiting region #6 and that it is still active and stays awake. The device of User A 200 next begins transmitting broadcast beacon #3 222. The device of User B 202 notifies the server that it is entering region #3 and that it is still active and stays awake. At some point near time=2 218, the device of User C 204 leaves the region, and it may take some time (typically up to a minute) for the server to report that User C 204 is gone with respect to other nearby devices running the app.

Sometime later, as shown in FIG. 2B, the device of User A 200 ceases transmitting broadcast beacon #3 222. At this time, the device of User B 202 notifies the server 208 that it is exiting region #3 and that it is still active and stays awake. The device of User A 200 then begins transmitting broadcast beacon #8 226. The device of User B 202 notifies the server that it is entering region #8 and that it is still active and stays awake.

Figure 3A:
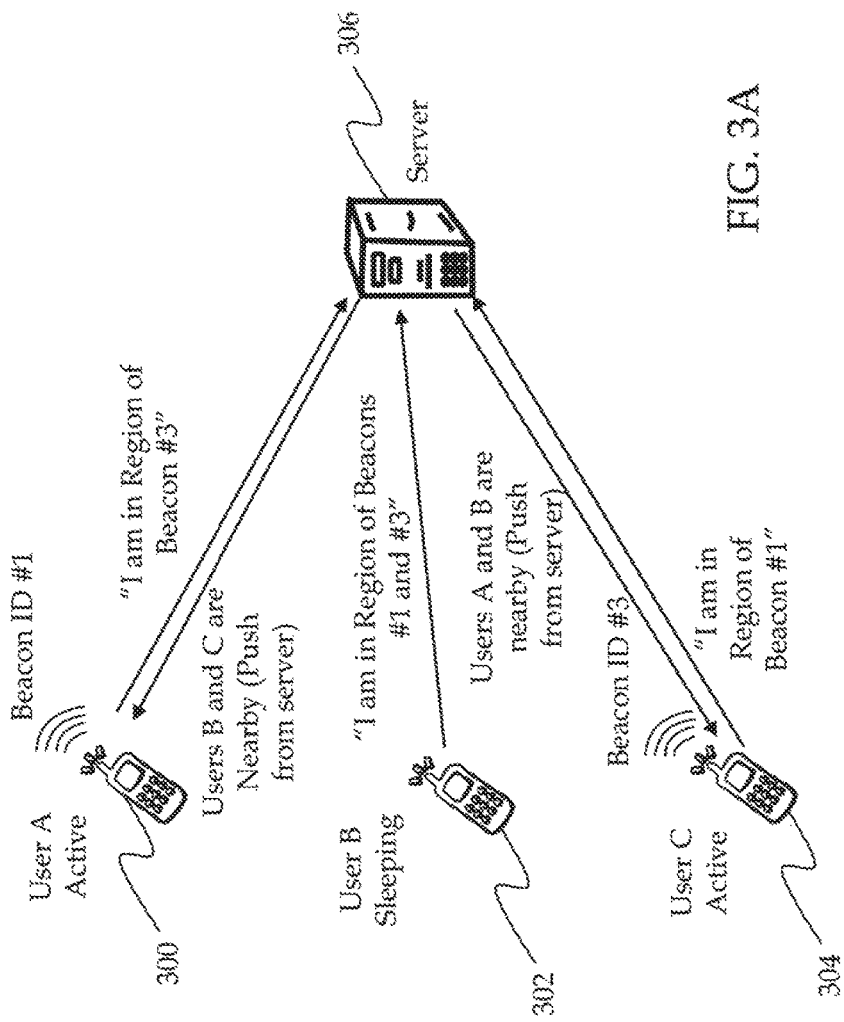
FIG. 3A is an alternative illustration of the connection process between three devices according to the present invention, similar to a portion of FIG. 2A.

The above communication scheme with reference to FIG. 2 exemplifies how devices with the app locate and maintain contact in order to be able to transmit content to each other. For clarity, similar communications are shown in FIG. 3A through FIG. 3C, which are described below.

A scenario similar to that of FIG. 2A in the time range from approximately half way between time=0 206 and time=1 212 through to before time=2 218 is shown. Initially, the device of User A 300 is active and is transmitting broadcast beacon #1; the device of User B 302 is sleeping; and the device of User C 304 is active and is transmitting broadcast beacon #3. The device of User A 300 receives beacon #3 and alerts the system server computer 306 that it is in the region of broadcast beacon #3. The device of User B 302 receives beacon #1 and beacon #3 and alerts the server computer 306 that it is in the regions of beacon #1 and #3. The device of User C 304 receives beacon #1 and alerts the server computer 306 that it is in the region of beacon #1. The server computer 306 then pushes out local lists to each of the devices, alerting the device of User A 300 that it is in the region of the devices of User B 302 and User C 304; alerting the device of User B 302 that it is in the region of the devices of User A 300 and User C 304; and alerting the device of User C 304 that it is in the region of the devices of User A 300 and User B 302. Thus, the devices are all alerted regarding other devices within their local region/proximity.

Figure 3B:
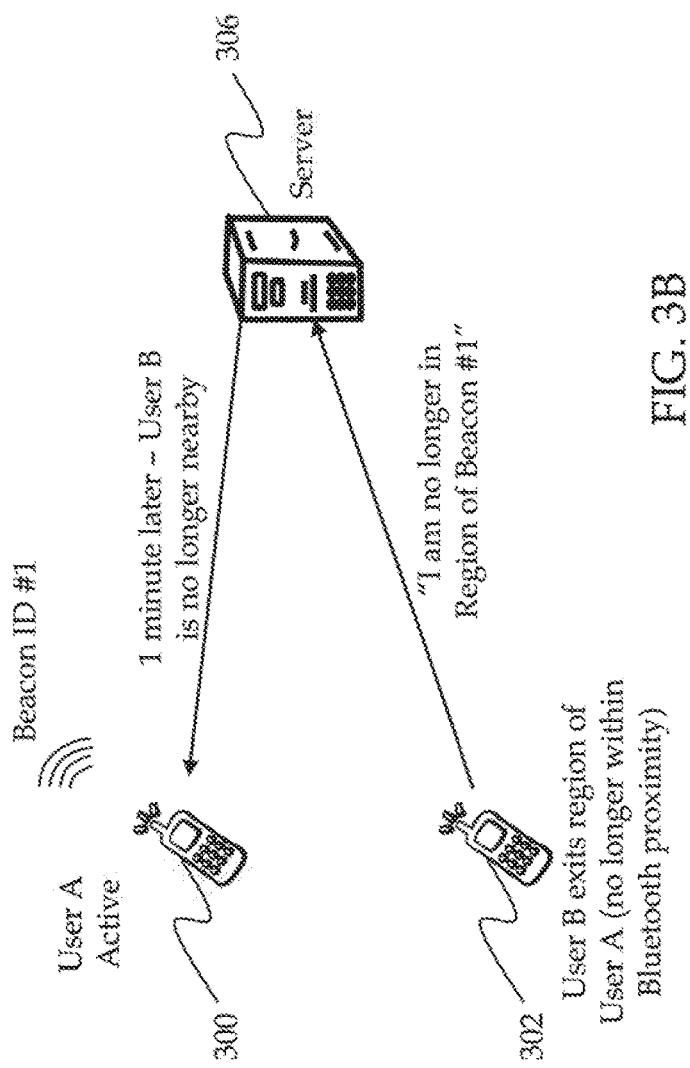
FIG. 3B is an alternative illustration of the process of one device exiting from the proximity of another according to the present invention, similar to a portion of FIG. 2A.
Figure 3C:
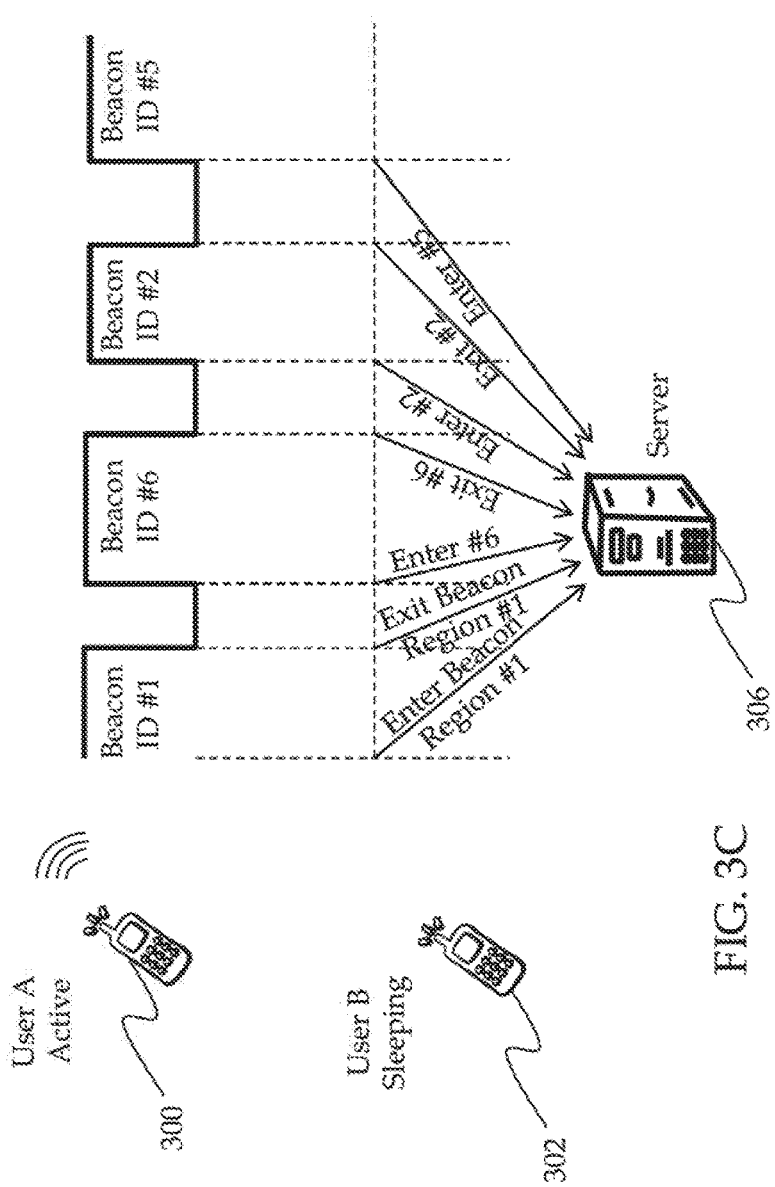
FIG. 3C is an alternative illustration of a device "hopping" between subsequent beacon regions according to the present invention, similar to a portion of FIG. 2A.

A scenario similar to that of FIG. 2A around time=2 218 is shown in FIG. 3B. In this case, a device is exiting the region of another device. In this case, the device of User A 300 is transmitting broadcast beacon #1 and the device of User B 302 is within the region of beacon #1. Subsequently, the device of User B 302 exits the (iBeacon) region of the device of User A 300 (e.g., moves beyond Bluetooth proximity). The device of User B 302 alerts the server computer 306 that it is no longer in the region of beacon #1. Subsequently, (typically within a minute), the server computer 306 relays information to the device of User A 300 that the device of User B 302 is no longer nearby. As a result, the app will cease transmitting content from the device of User A 300 to the device of User B 302.

Over time, the beacons with different beacon IDs are transmitted. Typically, the beacons are transmitted for one minute or less and vary somewhat in transmission length. Examples of beacons transmitted by the device of User A 300 are shown in the upper portion of FIG. 3C. In this case, the sequence of beacons transmitted is Beacon ID #1, Beacon ID #6, Beacon ID #2 and Beacon ID #5. As shown in the lower portion of FIG. 3C, as the device of User B 302 subsequently enters and exits each beacon, it informs the server computer 306; thus, it first enters beacon region #1, then exits beacon region #1, then enters beacon region #6, then exits beacon region #6, thenenters beacon region #2, then exits beacon region #2, then enters beacon region #5, thus ensuring that the region in which the device of User B 302 is located is continually updated.

Upon establishing a connection between User A, on one hand, and on the other hand User B, User C, User D, etc., the system will automatically add all app users who User A connected with to User A's contact list and the system will also add User A to the contact list of each user who User A connected with. The contact list is a list of other users of the app and is typically stored both locally on the user devices and also on the system's server computer. It is desirable that the contact list is persisted on the server computer even if a user uninstalls and re-installs the app. If Users B, C, and D, for example, have not shared any content with each other, because the system has shared content from User A with those users, the system will automatically add all of those users to each other's contact list.

The system can also automatically share content with certain of a user's established contacts who are not in range when sharing occurs. This occurs when a friend or contact is added as a "ghost." This feature will be described in detail below.

The app presents a method of displaying to users within range of each other so that users can see who else with active apps is nearby. This feature can show other users regardless of whether content has been shared one-way, two-way, or not at all. An illustration of a screenshot showing such a display mechanism is presented in FIG. 4. A series of "radar" bands 400 can be seen spreading radially outward from a circle 402 that represents the location of the user. The distance and angle of another user 404 from the circle 402 within the bands 400 provides an approximate representation of the distance of the other user 404 from the user. Icons representing another user 404 can provide information regarding the other user 404 such as a picture representation of the user, the status of the other user 404 as an active user local to the user of the device or a "ghost," identifying information regarding the user (e.g. their initials), identifying information regarding the user's device (e.g. the first initial of the user's device's name), etc. In the case shown, the other user 404 is a "ghost" and is represented by an image of the other user 404 surrounded by a "ghost"-shaped perimeter.

Figure 5:
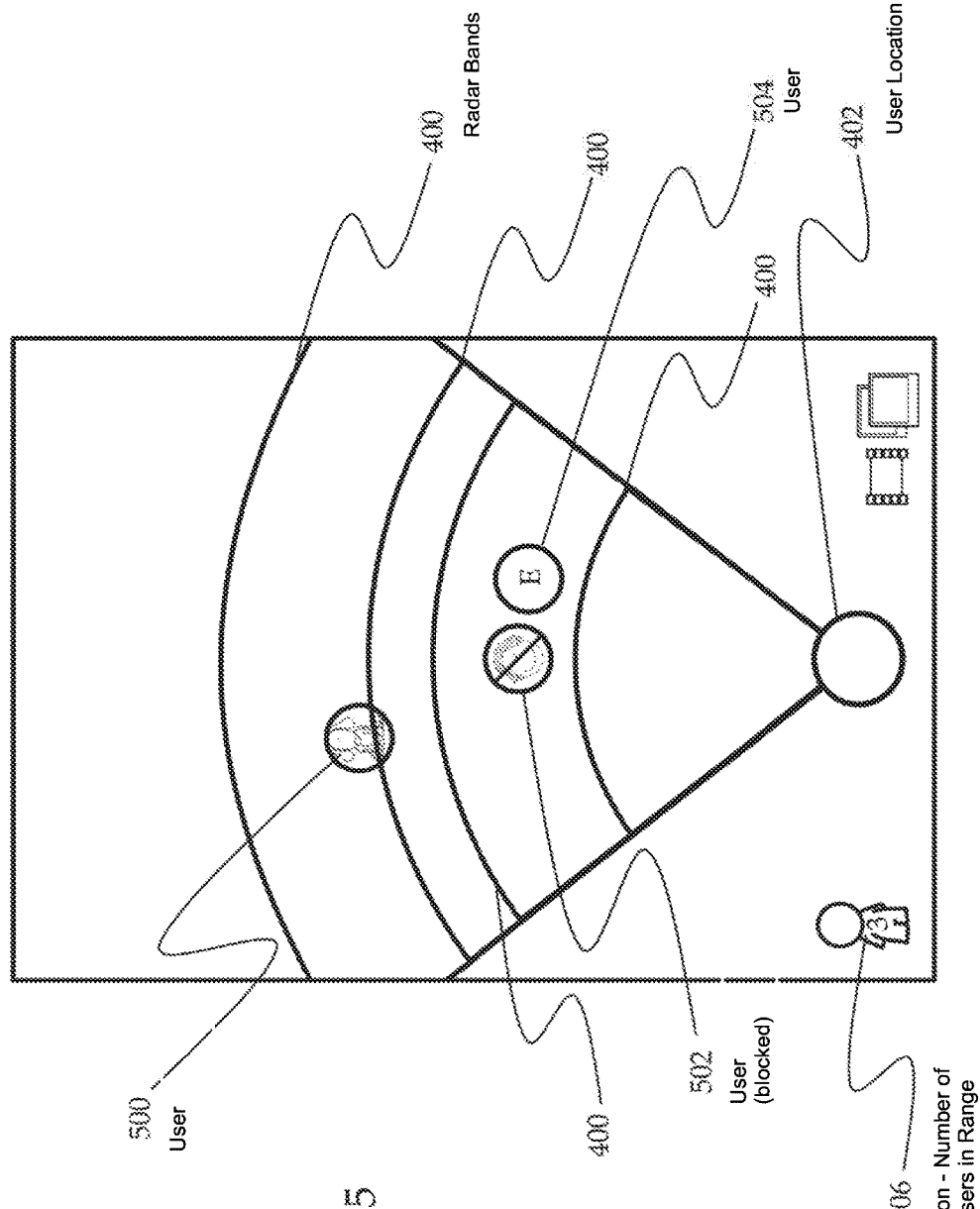
FIG. 5 is an illustration of a radar-type screen on a device showing both connected users and blocked users according to the present invention.

Another illustration of a screenshot is shown in FIG. 5, with three users, 500, 502, and 504, within range of the circle 402 representing the user of the device. In this case, user 502 is blocked from receiving content from the present device, as indicated by the diagonal bar across the icon representing user 502. Also, in the lower left-hand corner, an icon 506 displays the number of other users within range of the device. The location of the other users, 500, 502, and 504, within the radar bands 400 represents the approximate respective distance of the other users, 500, 502, and 504, from the user of the device. Note that in this case, user 502 is blocked.

Figure 6:
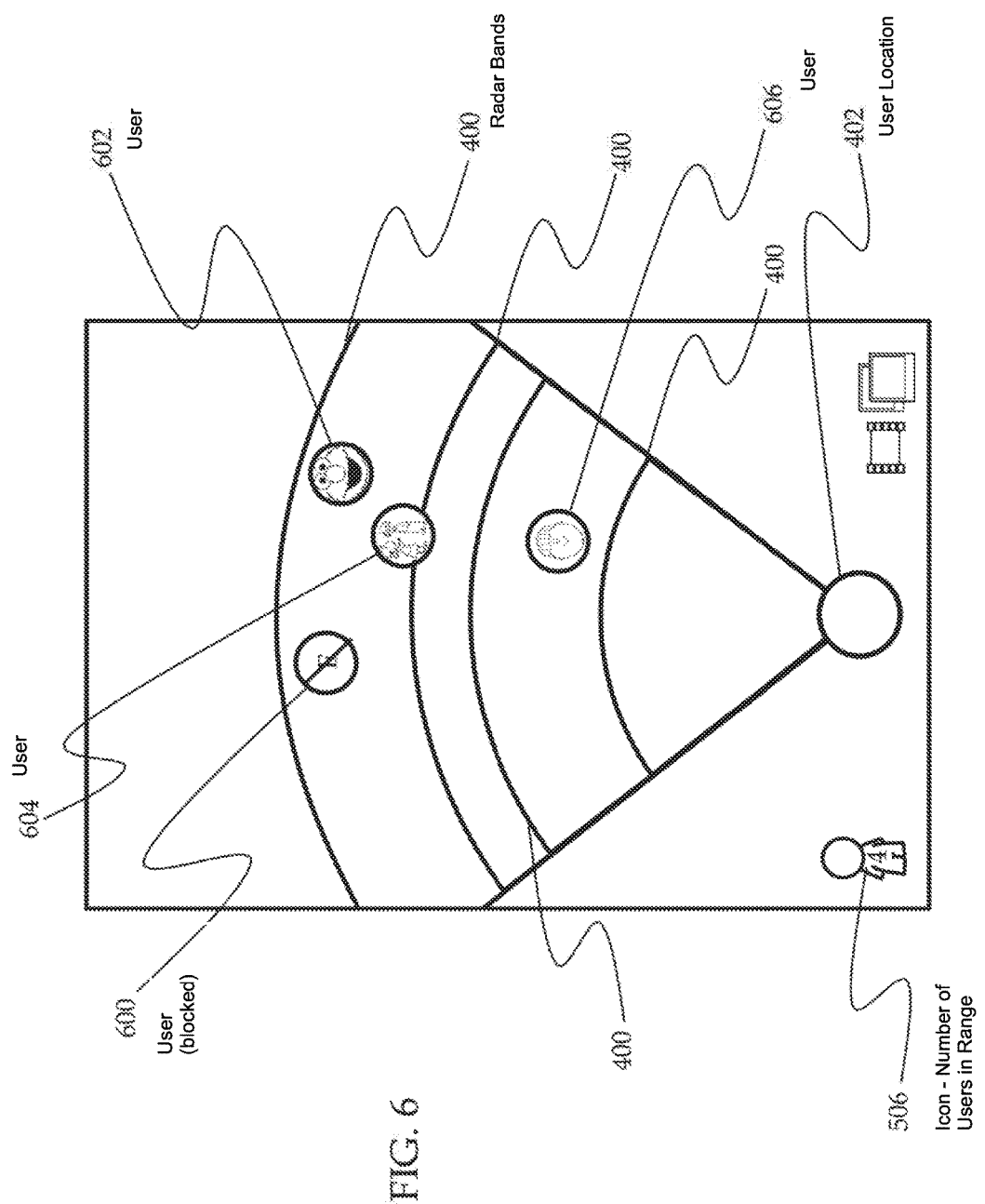
FIG. 6 is another illustration of a radar-type screen on a device showing both connected users and blocked users according to the present invention.
Figure 7:
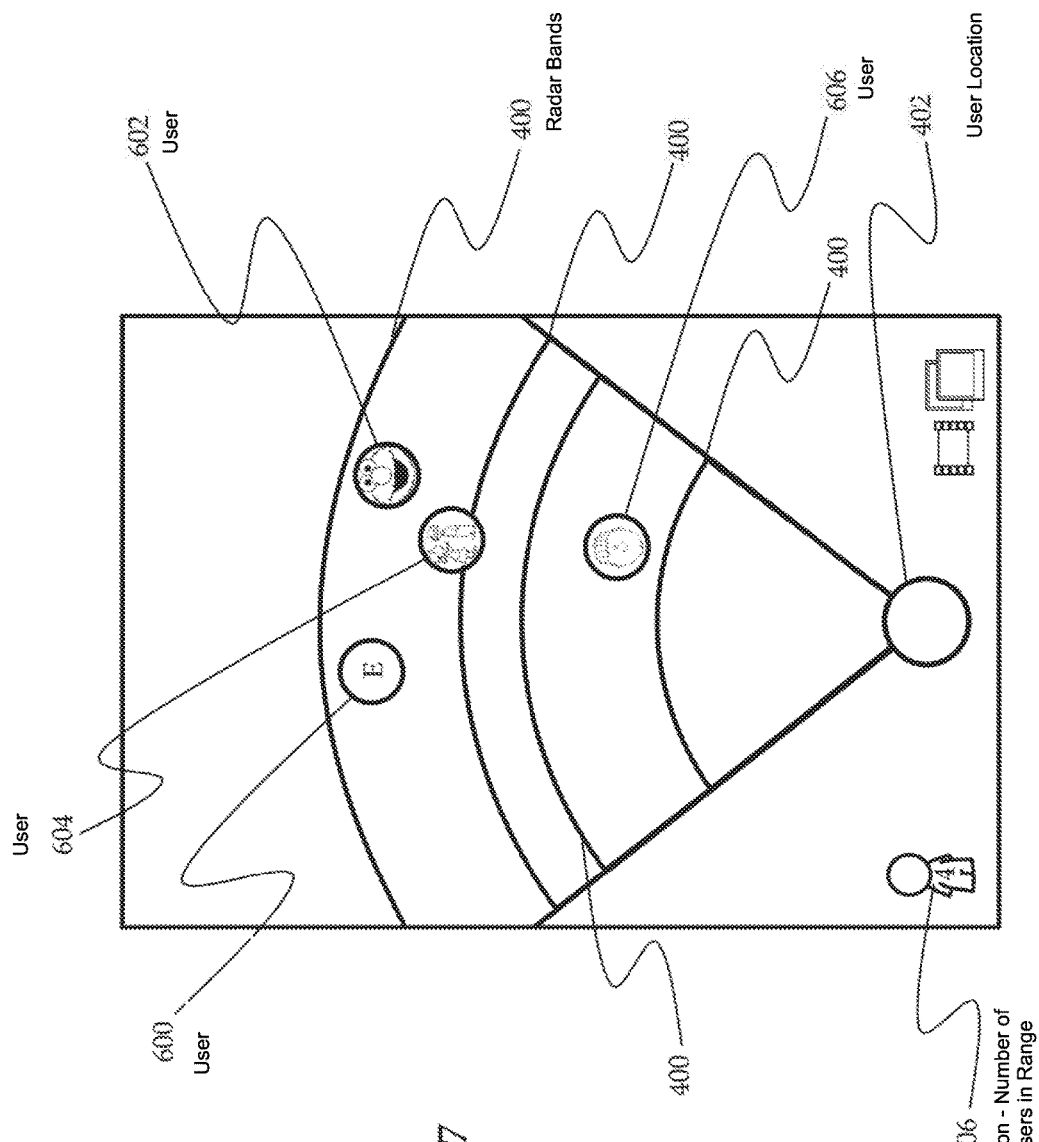
FIG. 7 is an illustration of a radar-type screen on a device showing connected users according to the present invention.

Two other illustrations of screenshots similar to those of FIGS. 4 and 5 are shown in FIGS. 6 and 7. In these illustrations, there are four other users, 600, 602, 604, and 606, the total number of which is represented by icon 506. In FIGS. 6 and 7, user 600 is blocked and unblocked, respectively.

Figure 8:
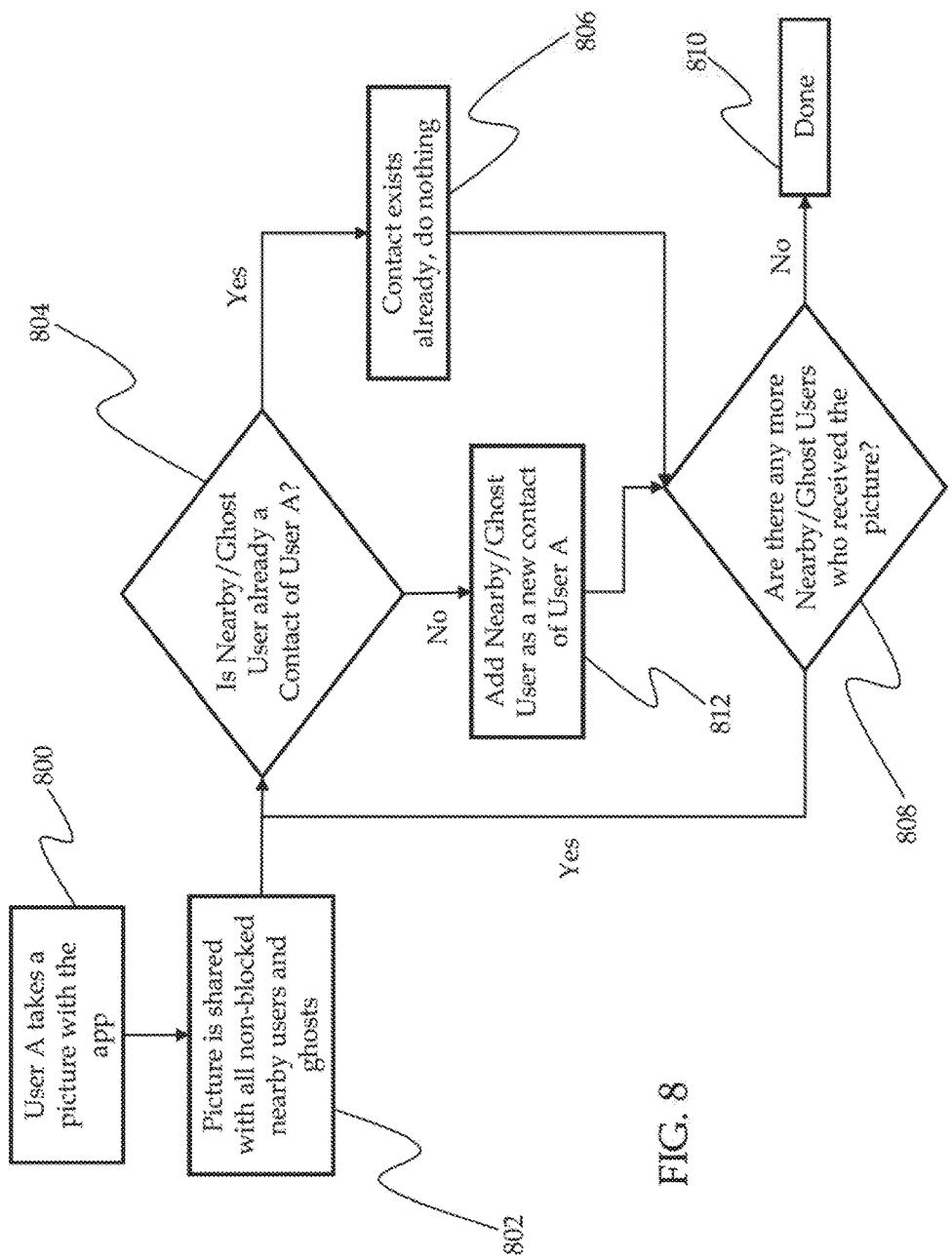
FIG. 8 is a flow chart illustrating a process for creating new connections according to the present invention.

A flow chart illustrating a process for creating new connections according to the present invention is shown in FIG. 8. As shown, User A takes a picture using the app 800. The picture is then shared with all non-blocked local (nearby) users and "ghosts" 802. The system determines whether each other (nearby or "ghost") user is already a contact of User A 804. If the other user is already a contact of User A, then nothing needs to be done 806 and the system determines whether there are any more other users that received the picture 808. If there are none, then the routine for creating new connections ends 810. If there are more users who received the picture, the routine determines whether the other user is already a contact of User A 804 and continues as shown. On the other hand, if the other user is not already a contact of User A, then the other user is added to the contact list of User A 812 and the routine determines whether there are still other users who received the picture 808 and continues until all other users have been added to the users contact list.

The present invention enables sharing of content between users who are on each other's contact lists even when those users are not in local range of each other when a share occurs. By going to the contacts screen within the application, there is an option to add that contact as a "ghost." This will virtually add a remote device to experience the same photos that are shared with a User (e.g. User A) and that a User (e.g. User A) shares with other Users (e.g. Users B, C and D). For example, assume that User A and User B are within local range of each other. User A takes a picture from within the app and the system shares the photo from User A with User B, and they are now listed in each other's contact list. User A manually selects the option to add User B as a "ghost" on User A's contact list. Following the addition by User A of User B as a "ghost," thereafter for a (typically) set period of time, when User A and User B are not in local range of each other, when User A shares content from the app, the system will cause that content to be shared with any out of range "ghosts," such as User B, as well as local users of the app. A contact who is added as a "ghost" typically remains a "ghost" for a set period of time and then that contact's "ghost" status expires, the period of time can be set to any desirable length (including having no ending time) and may or may not be user adjustable. To have that same contact become a "ghost" again the sharer must re-add the expired "ghost" device as a "ghost" again. The timed aspect of the "ghost" feature is to allow for contextual and purposeful sharing instead of sharing everything with the "ghost" until the user deselects the "ghost" or the "ghost" blocks the sharing user. For example, if User A goes to an event with contacts of User B, and User A and User B are already each other's contacts within the system, but User B isn't at the event (is not within local range of User A), and while at event party User A adds User B as a "ghost," then for the period of time that User B is User A's "ghost," whenever User A shares or receives content (e.g. photos) those photos will be shared with and among all local app users as well as the "ghosts" of those local app users. Here, User B who has been added as a "ghost" of User A will receive all of the photos that User A takes (typically for a set period of time, such as 30 minutes), and User B will also receive the photos of anyone who happens to be nearby User A that is using the app. It is presumed that User B will want to see photos of the event that involves his or her contacts. Further, assume User C is near User A and takes a photo. User C's photo is shared with User A, end User C and User A are added to each other's contact lists. User C and User B (User B is not locally present) were not previously on each other's contact lists, however, both User A and User B (who is "ghosted in" by User A) receive User C's photo and User B (the "ghost" of User A) and User C can be added to each other's contacts lists (typically by an action of the user). In a desirable aspect, one degree of "ghosts" is allowed (though in practice, any desired "degree" of "ghosting" is possible). For example, if User A activates (from User A's contact list) non-present User B as a "ghost" (e.g. "ghosts" User B in), then, in addition, all users currently "ghosted" in by User B will also be visible to User A. If content is shared, the users "ghosted" in by User B can also be added to User A's contact list. Active "ghosts" of User C can also be added to the contact list of User A and User A's active "ghosts." However, contacts of User C who are neither nearby nor active "ghosts" are not added to User A's contact list and active "ghosts."

"Ghosts" may also be "pinned" on the screen as favorites. While "pinned," the "ghosts" may still be blocked and unblocked. However, an icon representing the "ghost" will remain on the screen.

Another aspect of the invention is the ability to ignore a contact or connection for a period of time (or indefinitely) so as to temporarily stop receiving photos (and other content) from that user (e.g. temporarily blocking content from a particular user for 30 minutes). A user (e.g. User A) can also block another user (e.g. User B) in a manner that completely removes the other user from the user's contact list. A block typically happens for a predetermined period of time (e.g. 30 minutes), though it can also be indefinite. Other blocking options include:

1. Always Ignore—This removes a user from the blocker's radar forever and never allows them to see the blocker on their radar b u t leaves the person in the blocker's contacts list, so the blocker is able to retract this action. Additionally, this can also remove any content transmitted to the blocked user and remove any content received from them.

2. Delete Forever—This deletes a user from the blocker's contacts list as well as any content received from that user. Also, the blocked user will never be able to be added back to the blocker's contacts list. The blocked or removed user does not receive notification that the blocking/deleting user has blocked or removed them.

In the case where iBeacon technology is used to locate devices within range, when the app is opened, it immediately starts broadcasting a beacon region, with one of ten unique identifiers (IDs) shared by all apps according to the present invention. Every device with the app will automatically monitor regions regardless of whether the app is active or not. Devices with active apps will randomly stop broadcasting one particular region and start broadcasting a different region periodically (e.g. every 30-60 seconds).

The reasons for this particular behavior are:

1. Starting/Stopping beacon broadcasting triggers Exit/Enter Region events in monitoring devices with the app. This has the effect of waking up sleeping devices to actively range for beacons again and notify the server they are still nearby the broadcasting device.

2. Multiple beacons are used so that if there are other devices with active apps in close proximity, when User A's device stops broadcasting a beacon it minimizes the chance that there are other devices still broadcasting using the same beacon ID. This, in turn, would prevent devices with sleeping apps from triggering an "Exit Region" event as the region would not have disappeared.

3. Random durations are used for broadcasting/stopping/starting beacons to again maximize the chances of Exit/Enter Region events properly triggering when there are multiple devices with the app in close proximity.

When one app is opened and two or more devices with the app installed are recognized by the system as being within local proximity of each other, the system will create up to ten possible iBeacon regions. Each device monitors all active regions. Active devices randomly select as few as two devices with the app installed and broadcast is randomly switched between them. Since the system randomly selects regions, this increases the probability any single region won't be used by other devices around. Further, this ensures that the system is able to wake a sleeping device that is within the region. When someone opens an app, it starts broadcasting an iBeacon signal, all sleeping devices receive an entered region event. The devices detect and get parameters and report this information back to the server. Generally, every 30-60 seconds, the broadcasting device will stop broadcasting its current beacon and start broadcasting another beacon. Devices in range will receive exit and then enter region events.

Figure 9:
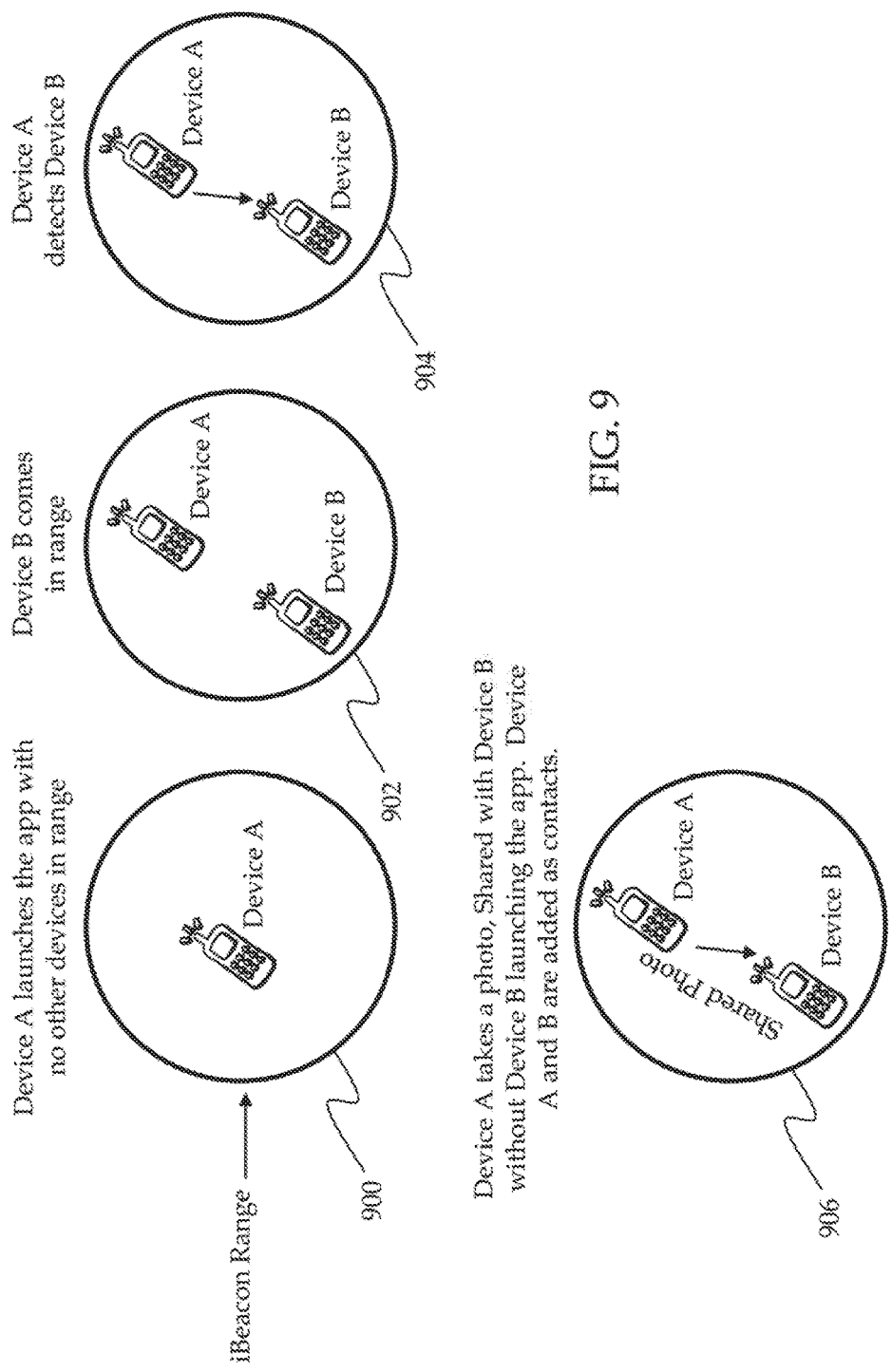
FIG. 9 is an illustrative diagram of two devices entering the local proximity of each other and establishing communication to share content according to the present invention.

For greater understanding of the principles of the invention, a series of devices with halos roughly representing the transmission area of beacons from the devices is presented in FIG. 9. In the first step, the app is launched by device A with no devices in range 900. Subsequently, Device B moves within the transmission (beacon) range of Device B 902. Next, Device A detects Device B 904. Note that non-limiting ways that this detection may be made include directly by Device A monitoring for the presence of device B; it may be made for Device B detecting a beacon of Device A and then Device B alerting Device A that it is within Device A's beacon range; or it may be by Device B detecting a beacon of Device A and then Device B alerting a server computer (not shown) that it is in the presence of Device A and then the server computer notifying Device A of Device B's presence (i.e. through an intermediary). Regardless of the detection mechanism, a connection is made such that Device A can share content (e.g. a photo) with Device B without Device B launching the app and Device A and Device Bare added as contacts 906. In some cases, to conserve resources, a lower resolution version of content (e.g. a photo) can be displayed on the device and a higher resolution version can either be stored on the device or available for downloading. The content can be stored remotely on a computer server for some period of time during which it is available for downloading.

Figure 10:
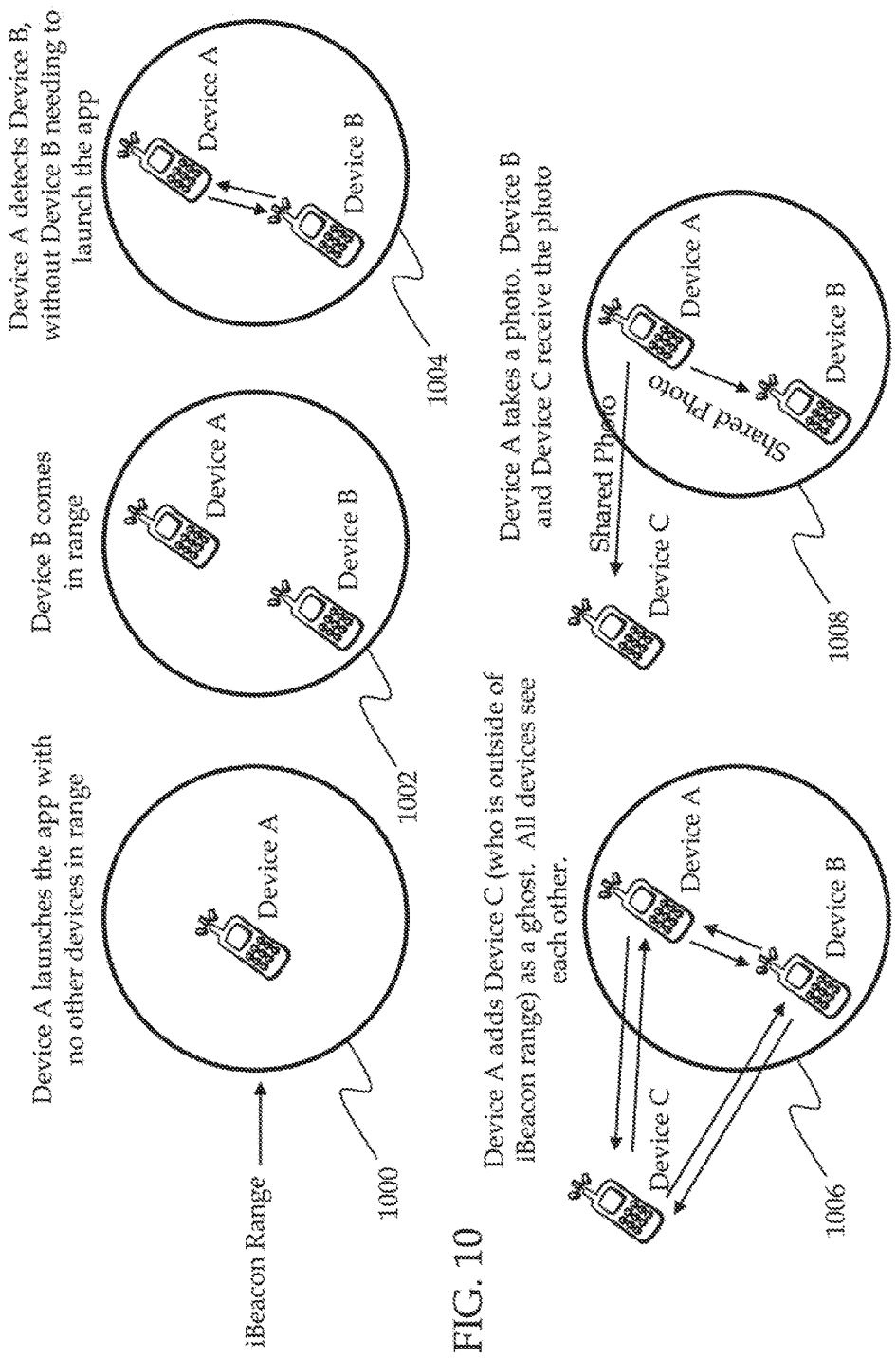
FIG. 10 is an illustrative diagram of two devices entering the local proximity of each other and establishing communication to share content according to the present invention, where one device adds a remote device as a "ghost."

The process of connecting with and transmitting content to a "ghost" is shown in FIG. 10. A connection between Device A and Device B similar to that shown in FIG. 9 (elements 900, 902, and 904) is presented by FIG. 10 elements 1000, 1002, and 1004. Next, Device A adds Device C (which is outside of the transmission range of the beacon, as represented by the halo) as a "ghost," and all devices are able to "see" each other 1006. In this case, Device A takes a photo which is then shared with both local Device B and "ghost" Device C 1008.

It will be readily apparent to persons skilled in the relevant art that various modifications and improvements may be made to the foregoing embodiments, in addition to those already described, without departing from the basic inventive concepts of the present invention.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for enabling proximity-based, peer-to-peer sharing of media comprising:

a mobile computing device with a processor and memory executing non-transitory computer readable instructions which cause the processor to:

detect and identify a geofence list of other mobile computing devices at a time within a geofence area, wherein the geofence area is a pre-defined area around a physical location of the mobile computing device which exists for a pre-determined period of time following the time and wherein presence within the geofence area is determined based upon a pre-determined physical distance from the mobile computing device without input from a user of the mobile computing device;

create a connections list of the identified other mobile computing devices, the connections list generated based upon the identified other mobile computing devices being within a physical range of a near-range location protocol from the mobile computing device; and allow access to sharable media on the mobile computing device by the other mobile computing devices included on the connections list without input from the user of the mobile computing device or users of the other mobile computing devices; and a server, including a second processor and a second memory, the server executing instructions that cause the second processor to:

receive the geofence list of mobile computing devices present within the geofence area and the connections list from the mobile computing device;

store the geofence list and the connections list; and compare the connections list with the geofence list and, when a second mobile computing device is included in the connections list and the geofence list, allow access by the second mobile computing device to the sharable media without input from a second user of the second mobile computing device, and when the second mobile computing device is included on the connections list but not on the geofence list, deny access to the sharable media by the second mobile computing device;

compare the connections list with the geofence list and, when a second mobile computing device is included in both the connections list and the geofence list, instruct the mobile computing device to allow access to the sharable media available on the second mobile computing device, and when the second mobile computing device is included on the connections list but not on the geofence list, instruct the mobile computing device to deny access to the sharable media available on the second mobile computing device; and compare the time with a then current time and, when the pre-determined period of time for existence of the geofence area has lapsed, instruct the mobile computing device to deny access to any media for all other mobile computing devices within the geofence list.

2. The system of claim 1 wherein the non-transitory computer readable instructions further cause the processor to allow a second mobile computing device identified on the connections list, without input from a user of the second mobile computing device, to automatically access and obtain sharable media from the mobile computing device.

3. The system of claim 2 wherein the non-transitory computer readable instructions further cause the processor to enable the mobile computing device to make available the sharable media for unrestricted access by the identified other mobile computing devices in the connections list.

4. The system of claim 1 wherein a request for media from a requesting mobile computing device includes a universal uniform resource locator (URL) that may be used to simultaneously request all stored media within any geofence area including the requesting mobile computing device.

5. A system for enabling proximity-based, peer-to-peer sharing of media comprising:

a mobile computing device with a processor and memory executing non-transitory computer readable instructions which cause the processor to;

detect and identify a geofence list of other mobile computing devices at a time within a geofence area, wherein the geofence area is a pre-defined area around a physical location of the mobile computing device which exists for a pre-determined period of time following the time and wherein presence within the geofence area is determined based upon a predetermined physical distance from the mobile computing device without input from a user of the mobile computing device;

create a connections list of the identified other mobile computing devices, the connections list generated based upon the identified other mobile computing devices being within a physical range of a near-range location protocol from the mobile computing device;

allow access to sharable media on the mobile computing device by the other mobile computing devices included on the connections list without input from the user of the mobile computing device or users of the other mobile computing devices; and a server, including a second processor and a second memory, the server executing instructions that cause the second processor to:

receive the geofence list of mobile computing devices present within the geofence area and the connections list from the mobile computing device;

store the geofence list and the connections list;

compare the connections list with the geofence list and, when a second mobile computing device is included in the connections list and the geofence list, allow access by the second mobile computing device to the sharable media without input from a second user of the second mobile computing device, and when the second mobile computing device is included on the connections list but not on the geofence list, deny access to the sharable media by the second mobile computing device;

receive the sharable media from a second mobile computing device from within the geofence area without input from the user of the mobile computing device;

store the sharable media in a media storage database;

receive a request for media from a second mobile computing device;

compare the connections list with the geofence list and, when the second mobile computing device is included in the connections list and the geofence list, allow access by the second mobile computing device to the sharable media, and when the second mobile computing device is included in the connections list but not on the geofence list, deny access to the sharable media by the second mobile computing device; and compare the time with a then current time and, when a pre-determined period of time for existence of the geofence area has lapsed, deny access to the sharable media by all mobile computing devices.

6. A method for enabling proximity-based, peer-to-peer sharing of media comprising:

detecting and identifying a geofence list of mobile computing devices present within a geofence area at a time from a first mobile computing device, wherein the geofence area is a pre-defined area around a physical location of the first mobile computing device which exists for a pre-determined period of time following the time and wherein presence within the geofence area is determined, without input from the users of the mobile computing devices, based upon a physical location of the first mobile computing device;

storing a connections list of mobile computing devices reachable by the first mobile computing device using a near-range location protocol in a connections database;

comparing the connections list with the geofence list and, when a second mobile computing device is included in the connections list and the geofence list, allow access by the second mobile computing device to sharable media on the first mobile computing device without input by a second user of the second mobile computing device, and when the second mobile computing device is included on the connections list but not on the geofence list, deny access to the sharable media by the second mobile computing device;

comparing the connections list with the geofence list and, when a second mobile computing device is included in both the connections list and the geofence list and during the pre-determined period of time, allowing access to media available on the second mobile computing device, and when the second mobile computing device is included on the connections list but not on the geofence list or not within the pre-determined period of time, denying access to the media available on the second mobile computing device; and comparing the time with a then current time and, when the pre-determined period of time for existence of the geofence area has lapsed, denying access to any media for all other mobile computing devices within the geofence list.

7. The method of claim 6 wherein a request for media from a requesting mobile computing device includes a universal uniform resource locator (URL) that may be used to simultaneously request all stored media within any geofence area including the requesting mobile computing device.

8. A method for enabling proximity-based, peer-to-peer sharing of media comprising:

detecting and identifying a geofence list of mobile computing devices present within a geofence area at a time from a first mobile computing device, wherein the geofence area is a pre-defined area around a physical location of the first mobile computing device which exists for a pre-determined period of time following the time and wherein presence within the geofence area is determined, without input from the users of the mobile computing devices, based upon a physical location of the first mobile computing device;

storing a connections list of mobile computing devices reachable by the first mobile computing device using a near-range location protocol in a connections database;

comparing the connections list with the geofence list and, when a second mobile computing device is included in the connections list and the geofence list, allow access by the second mobile computing device to sharable media on the first mobile computing device without input by a second user of the second mobile computing device, and when the second mobile computing device is included on the connections list but not on the geofence list, deny access to the sharable media by the second mobile computing device;

transferring media from the first mobile computing device from within the geofence area to a server without input from the user of the first mobile computing device;

storing the sharable media in a media storage database;

receiving a request for media from a second mobile computing device;

comparing the connections list with the geofence list and, when the second mobile computing device is included in the connections list and the geofence list, allowing access by the second mobile computing device to the sharable media, and when the second mobile computing device is included in the connections list but not on the geofence list, denying access to the sharable media by the second mobile computing device; and comparing the time with a then current time and, when a pre-determined period of time for existence of the geofence area has lapsed, denying access to the media by all mobile computing devices.

* * * * *